(12) United States Patent
Fairy et al.

(10) Patent No.: US 7,775,788 B2
(45) Date of Patent: Aug. 17, 2010

(54) MELT TRANSFER COMPONENTS FOR A STACK MOLDING SYSTEM

(75) Inventors: Fabrice Fairy, Georgetown (CA); Denis Babin, Georgetown (CA)

(73) Assignee: Mold-Masters (2007) Limited, Georgetown, ON (CA)

( * ) Notice: Subject to any disclaimer, the term of this patent is extended or adjusted under 35 U.S.C. 154(b) by 206 days.

(21) Appl. No.: 12/186,126

(22) Filed: Aug. 5, 2008

(65) Prior Publication Data
US 2010/0034920 A1 Feb. 11, 2010

(51) Int. Cl.
B29C 45/23 (2006.01)

(52) U.S. Cl. ........................ 425/564; 425/572

(58) Field of Classification Search ............... 425/563, 425/564, 565, 572, 581, 588; 264/328.8
See application file for complete search history.

(56) References Cited

U.S. PATENT DOCUMENTS

| | | | |
|---|---|---|---|
| 2,770,011 A | 11/1956 | Kelly | |
| 4,891,001 A | 1/1990 | Gellert | |
| 5,049,062 A | 9/1991 | Gellert | |
| 5,229,145 A | 7/1993 | Brown et al. | |
| 5,609,893 A | 3/1997 | Eastwood | |
| 5,846,472 A | 12/1998 | Rozema | |
| 6,409,955 B1 | 6/2002 | Schmitt et al. | |
| 6,575,731 B1 * | 6/2003 | Olaru et al. | 425/564 |
| 6,712,597 B1 | 3/2004 | Van Boekel | |
| 6,835,060 B2 | 12/2004 | Sicilia | |
| 6,852,265 B2 * | 2/2005 | Olaru et al. | 425/572 |
| 7,115,226 B2 | 10/2006 | Olaru | |
| 7,122,145 B2 | 10/2006 | Olaru et al. | |
| 7,261,553 B2 | 8/2007 | Ciccone et al. | |
| 7,329,118 B2 | 2/2008 | Pruden et al. | |
| 2002/0121713 A1 | 9/2002 | Moss et al. | |
| 2004/0156944 A1 | 8/2004 | Olaru | |
| 2005/0255189 A1 | 11/2005 | Manda et al. | |
| 2005/0287244 A1 | 12/2005 | Glaesener | |

(Continued)

FOREIGN PATENT DOCUMENTS

CA 2441139 3/2005

(Continued)

OTHER PUBLICATIONS

"International Search Report and Written Opinion", *Int'l Appl No. PCT/CA2009/001072* Oct. 7, 2009.

*Primary Examiner*—Tim Heitbrink
(74) *Attorney, Agent, or Firm*—Medler Ferro PLLC (57) ABSTRACT

A stack molding apparatus is disclosed having a stationary mold platen and a movable mold platen defining a parting line. The apparatus has a melt transfer nozzle extending within a well in the stationary mold platen, the melt transfer nozzle defining a melt channel for receiving and transporting a melt stream. The apparatus also includes a melt transfer component having a spigot portion, a melt channel and an aperture in a sealing surface thereof, wherein the melt transfer component is fixedly attached to the stationary mold platen such that the sealing surface defines a portion of the parting line. The spigot portion is slidably fit within the melt channel of the melt transfer nozzle so that the melt channels are in fluid communication. When the stack molding apparatus is brought to an operating temperature, the melt transfer nozzle slides over the spigot portion to accommodate thermal expansion.

22 Claims, 9 Drawing Sheets

U.S. PATENT DOCUMENTS

2008/0089976 A1    4/2008    Dzafic et al.
2008/0145473 A1    6/2008    Eigler et al.

FOREIGN PATENT DOCUMENTS

| | | |
|---|---|---|
| CA | 2657961 | 1/2008 |
| DE | 33 38 783 | 3/1985 |
| DE | 10-150419 | 5/2003 |
| JP | 51-103151 | 9/1976 |
| JP | 58-014728 | 1/1983 |
| JP | 4-030916 | 3/1992 |
| JP | 2004/142366 | 5/2004 |
| JP | 2005-041020 | 2/2005 |
| WO | WO 2006/000541 | 1/2006 |
| WO | WO 2007/051857 | 5/2007 |
| WO | WO 2007/052869 | 5/2007 |
| WO | WO 2007/143808 | 12/2007 |

* cited by examiner

MELT TRANSFER COMPONENTS FOR A STACK MOLDING SYSTEM

FIELD OF THE INVENTION

The present invention relates to injection molding and more particularly to melt transfer mechanisms for a stack molding system that convey a melt stream of moldable material from a fixed platen to a movable platen of an injection molding machine.

BACKGROUND OF THE INVENTION

Stack molding provides an advantage over single molding in that it enables the output of an injection molding machine to be at least doubled without significantly increasing its size. Stack mold configurations, such as those shown in U.S. Pat. No. 4,891,001 to Gellert, U.S. Pat. No. 5,846,472 to Rozema, U.S. Pat. No. 5,229,145 to Brown, and U.S. Pat. No. 7,115,226 to Olaru, each of which is incorporated by reference herein in its entirety, generally employ a stationary first platen, a movable center platen and a movable second platen. The mold cavities are conventionally located on opposing faces of the movable center platen. The movable center platen and the second movable platen reciprocate to open and close the mold cavities during a production cycle.

In a stack molding apparatus, a manifold system extends through the center platen in order to reach the mold cavities located on each side of the center platen via branching manifold melt channels. In some instances, multi-cavity stack molds use a valve-gated melt transfer nozzle, which is coupled to the stationary platen, to deliver a melt from an extruder nozzle of the injection molding machine to a second valve-gated melt transfer nozzle, which is coupled to the movable center platen, to transfer the melt to the manifold. The manifold than delivers melt into various hot runner injection molding nozzles that are associated with each individual mold cavity. In a variation on these arrangements, the melt transfer nozzles may instead be thermal gated.

In conventional stack molding arrangements using nozzle to nozzle melt transfer, heat expansion contributes to proper sealing between the two nozzles, which results in a very sensitive solution where processing temperatures influence the performance of the seal. For instance, if a lower processing temperature is used it may reduce the heat expansion of one or both of the melt transfer nozzles thereby adversely affecting the sealing contact there between. One approach to addressing the problem of leakage due to improper sealing is to calculate the heat expansion of the melt transfer nozzles and determine a preload that is to be maintained between the two nozzles in the mold closed configuration. However, a lack of proper preload and/or a lower processing temperature often creates a gap between the two melt transfer nozzles where molten plastic gets trapped, thereby resulting in "leakage." At the other extreme, an excessive preload may constrain the melt transfer nozzle assemblies, which can cause damage to these components and/or result in some "leakage" at the transfer point between the downstream melt transfer nozzle and the manifold. As such, a stack molding arrangement where sealing between the melt transfer nozzles is not dependent on the heat expansion of the nozzles may provide a desirable solution for certain injection molding applications.

BRIEF SUMMARY OF THE INVENTION

Embodiments of the present invention relate to a stack molding apparatus having a stationary mold platen and a movable mold platen defining a parting line there between. The stack molding apparatus includes an upstream melt transfer component with a first sealing surface and a first spigot portion, wherein the upstream melt transfer component is fixedly attached to the stationary mold platen such that the first sealing surface defines a portion of the parting line. The stack molding apparatus includes a downstream melt transfer component with a second sealing surface and a second spigot portion, wherein the downstream melt transfer component is fixedly attached to the movable mold platen such that the second sealing surface defines a portion of the parting line. An upstream melt transfer nozzle defining a first melt channel for transporting a melt stream from a melt source is seated within the stationary mold platen, such that the first spigot portion of the upstream melt transfer component is slidably fit within a downstream end of the first melt channel. A downstream melt transfer nozzle defining a second melt channel for receiving the melt stream from the upstream melt transfer nozzle extends within the movable mold platen, such that the second spigot portion of the downstream melt transfer component is slidably fit within an upstream end of the second melt channel. When the stack molding apparatus is brought to an operating temperature, the upstream and downstream melt transfer nozzles slide over the first and second spigot portions of the upstream and downstream melt transfer components, respectively, to accommodate thermal expansion.

In alternate embodiments, the stack molding apparatus may include an upstream and/or a downstream melt transfer nozzle with a transfer seal attached thereto, such that a respective spigot portion of the upstream or downstream melt transfer component is slidably received within the transfer seal.

In another embodiment, one or both of the upstream and downstream configurations of the stack molding apparatus may include a melt transfer nozzle having a transfer seal and defining a melt channel for receiving a melt stream from a melt source, wherein a portion of the melt channel is defined by an inner surface of the transfer seal. The stack molding apparatus according to this embodiment includes a melt transfer component having a melt channel and an aperture in a sealing surface thereof, the melt transfer component being fixedly attached to its respective mold platen such that the sealing surface defines a portion of the parting line. In such an embodiment, an end of the transfer seal of the melt transfer nozzle may be slidably fit within the melt channel of the melt transfer component such that when the stack molding apparatus is brought to an operating temperature the end of the transfer seal slides within the melt channel of the melt transfer component to accommodate thermal expansion.

BRIEF DESCRIPTION OF DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF THE INVENTION

Specific embodiments of the present invention are now described with reference to the figures, wherein like reference numbers indicate identical or functionally similar elements. The following detailed description is merely exemplary in nature and is not intended to limit the invention or the application and uses of the invention. Although the description of the invention is in the context of a stack mold injection molding apparatus used in a hot runner application for transporting melt, embodiments of the present invention may also be used in any other injection molding arrangements where it is deemed useful, such as in any injection molding mold including thermoset molding. Furthermore, there is no intention to be bound by any expressed or implied theory presented in the preceding technical field, background, brief summary or the following detailed description.

Figure 1:
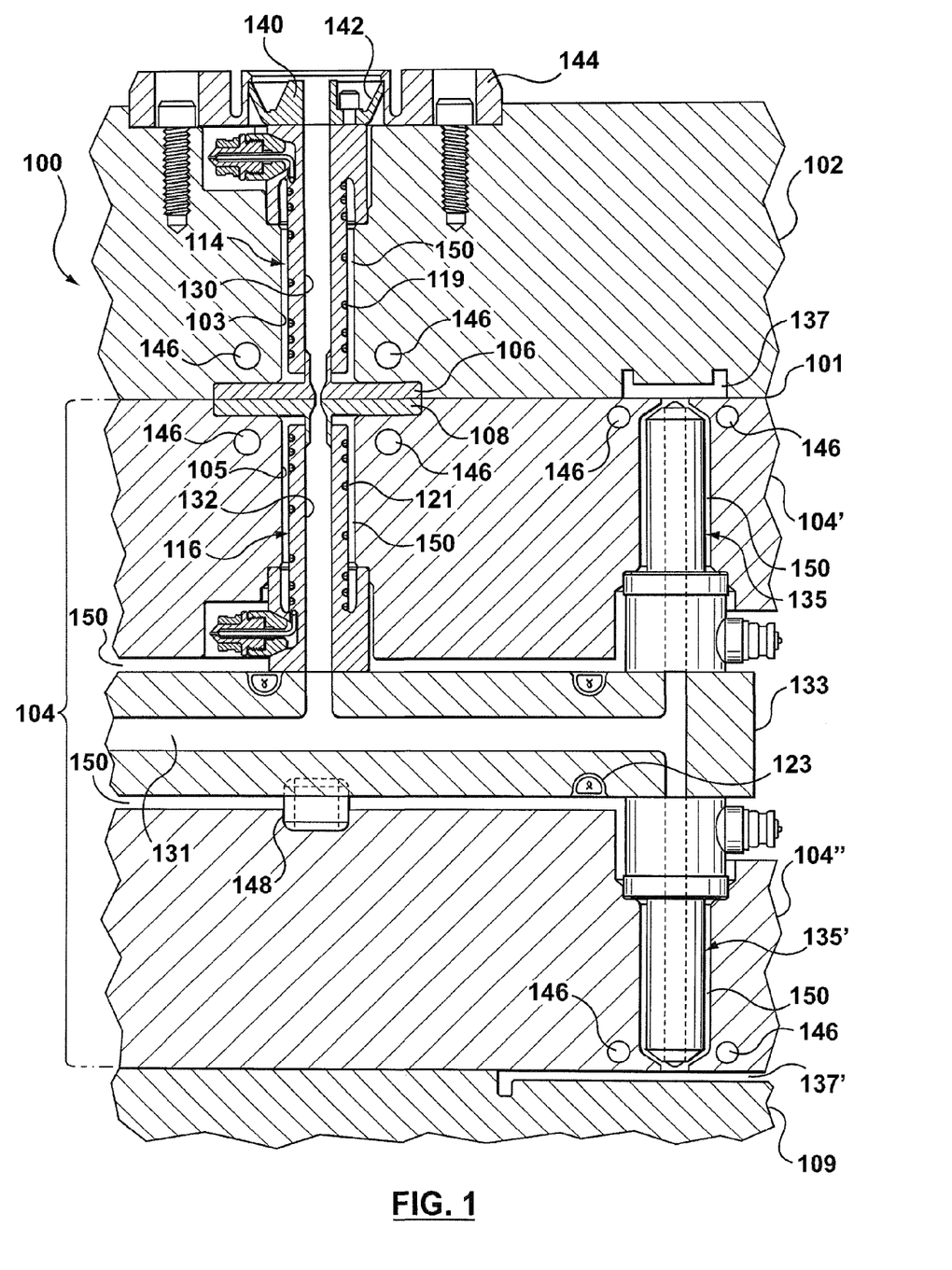
FIG. 1 is a schematic sectional view of a stack molding system according to an embodiment of the present invention.
Figure 2:
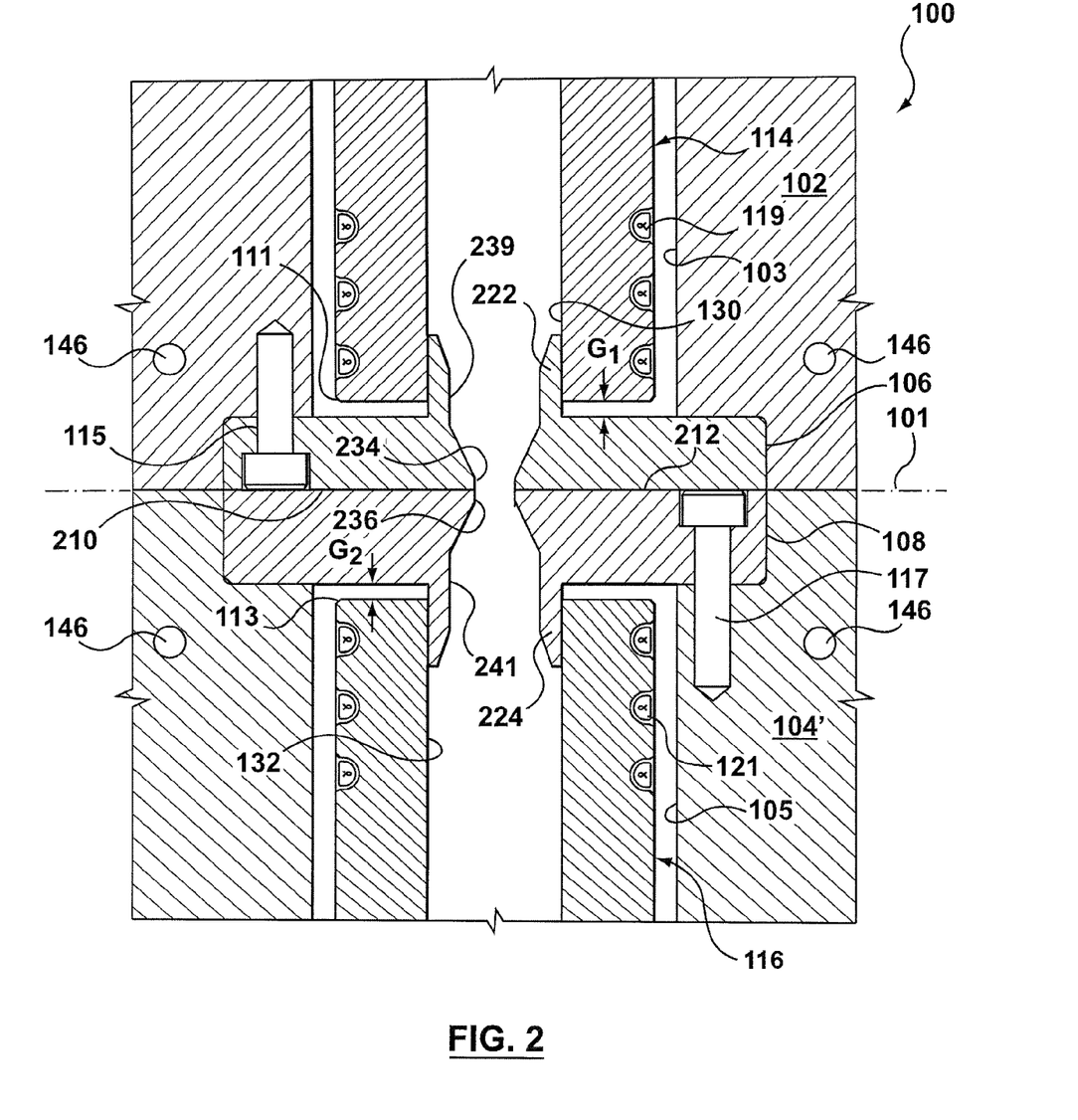
FIG. 2 is an enlarged view of the melt transfer components shown in the stack molding system of FIG. 1.

FIG. 1 is a schematic sectional view of a stack molding system 100 according to an embodiment of the present invention, with FIG. 2 being an enlarged view of the melt transfer area of FIG. 1. Stack molding system 100 includes a stationary first platen 102, a movable center platen 104 and a movable second platen 109. Mold cavities 137, 137' are located on opposing faces of mold plates 104', 104" of movable center platen 104. Movable center platen 104 and movable second platen 109 reciprocate to open and close mold cavities 137, 137' during a production cycle.

Stack molding system 100 conveys a melt stream of moldable material received from an injection molding machine (not shown) through a first melt channel 130 of an upstream melt transfer or sprue nozzle 114, which is seated in a well 103 in stationary first platen 102, to a second melt channel 132 of a downstream melt transfer or sprue nozzle 116, which is seated in a well 105 in mold plate 104' of movable center platen 104. In the embodiment shown, melt transfer nozzles 114, 116 are heated by embedded heaters 119, 121, respectively, but it would be understood by one of ordinary skill in the art that a band, rod, or other heater may be used without departing from the scope of the present invention. The melt stream flows from downstream melt transfer nozzle 116 through melt channel 131 of a manifold 133, which is heated by an embedded manifold heater 123, to be divided into hot runner nozzles 135, 135'. Nozzles 135, 135' than deliver the melt stream to mold cavities 137, 137', respectively. Although only two hot runner nozzles and corresponding mold cavities are shown in FIG. 1, it would be understood by one of skill in the art that a like number of nozzles and mold cavities would be positioned on the opposite end of the manifold to balance the melt flow there through. In addition, any number of hot runner nozzles and mold cavities may be accommodated in stack molding arrangements according to embodiments of the present invention without departing from the scope hereof.

In the embodiment of FIG. 1, melt transfer nozzle 114 has a backplate 140 fastened to an upstream end and is secured in place in well 103 by the abutment of a flanged portion 142 of backplate 140 against a retaining collar 144, which is fastened to stationary first platen 102. Further details of this arrangement are more fully described in U.S. Pat. No. 4,795,338 to Gellert, which is incorporated by reference herein in its entirety. Stationary first platen 102 and mold plates 104', 104" of movable center platen 104 are cooled by pumping cooling water through cooling conduits 146. Melt transfer nozzles 114, 116, hot runner manifold 133, and hot runner nozzles 135, 135' are separated from the cooled mold platens 102, 104 by insulative air spaces 150 there between. A locating ring 148 bridges air space 150 to laterally secure manifold 133. As such, melt transfer nozzles 114, 116 are substantially prevented from moving longitudinally at their upstream and downstream ends, respectively, which maintains a sealed melt path between the components of stack molding system 100.

With reference to FIGS. 1 and 2, a first melt transfer component 106 is positioned within stationary platen 102 at a downstream end 111 of melt transfer nozzle 114. In the embodiment shown, first melt transfer component 106 is secured to stationary platen 102 by one or more bolts 115, such that first melt transfer component 106 does not move relative to stationary platen 102 and melt transfer nozzle 114. First melt transfer component 106 defines a first melt channel 239 that generally tapers from an upstream end of a first spigot portion 222 to an aperture 234 defined in a first sealing surface 210 thereof. First spigot portion 222 is slidably receivable within melt channel 130 of melt transfer nozzle 114, such that first melt channel 239 is in fluid communication with melt channel 130. First spigot portion 222 of the first melt transfer component 106 is generally a tubular projection that longitudinally extends from a radially-extended base portion of the first melt transfer component 106. First spigot portion 222 has an outer diameter that is substantially equal to an inner diameter of melt channel 130 to tightly or closely fit therein. In a cold condition, a gap $G_1$ separates the downstream end 111 of melt transfer nozzle 114 and an opposed, upstream surface of first melt transfer component 106.

A second melt transfer component 108 is positioned within mold plate 104' of moveable center platen 104 at an upstream end 113 of melt transfer nozzle 116. In the embodiment shown, second melt transfer component 108 is secured to mold plate 104' of moveable center platen 104 by one or more bolts 117, such that second melt transfer component 108 does not move relative to mold plate 104' and melt transfer nozzle 116. Second melt transfer component 108 defines a second melt channel 241 that generally tapers from a downstream end of a second spigot portion 224 to an aperture 236 defined in a second sealing surface 212 thereof. Second spigot portion 224 is slidably receivable within melt channel 132 of melt transfer nozzle 116, such that second melt channel 241 is in fluid communication with melt channel 132. Second spigot portion 224 of the second melt transfer component 108 is generally a tubular projection that longitudinally extends from a radially-extended base portion of the second melt transfer component 108. Second spigot portion 224 has an outer diameter that is substantially equal to an inner diameter of melt channel 132 to tightly or closely fit therein. In a cold condition, a gap $G_2$ separates the upstream end 113 of melt transfer nozzle 116 and an opposed, downstream surface of second melt transfer component 108.

First and second melt transfer components 106, 108 have opposed first and second sealing surfaces 210, 212, respectively, that abut each other along parting line 101 in the mold closed position, as shown in FIGS. 1 and 2. In addition in the mold closed configuration, apertures 234, 236 of first and second melt transfer components 106, 108, respectively, are in fluid communication such that melt may be transferred from melt transfer nozzle 114 to melt transfer nozzle 116. When stack molding system 100 is brought to an operating temperature, gaps $G_1$, $G_2$ and the sliding arrangement between first and second spigots 222, 224 and melt channels 130, 132, respectively, accommodate the heat expansion of melt transfer nozzles 114, 116, respectively.

Figure 3:
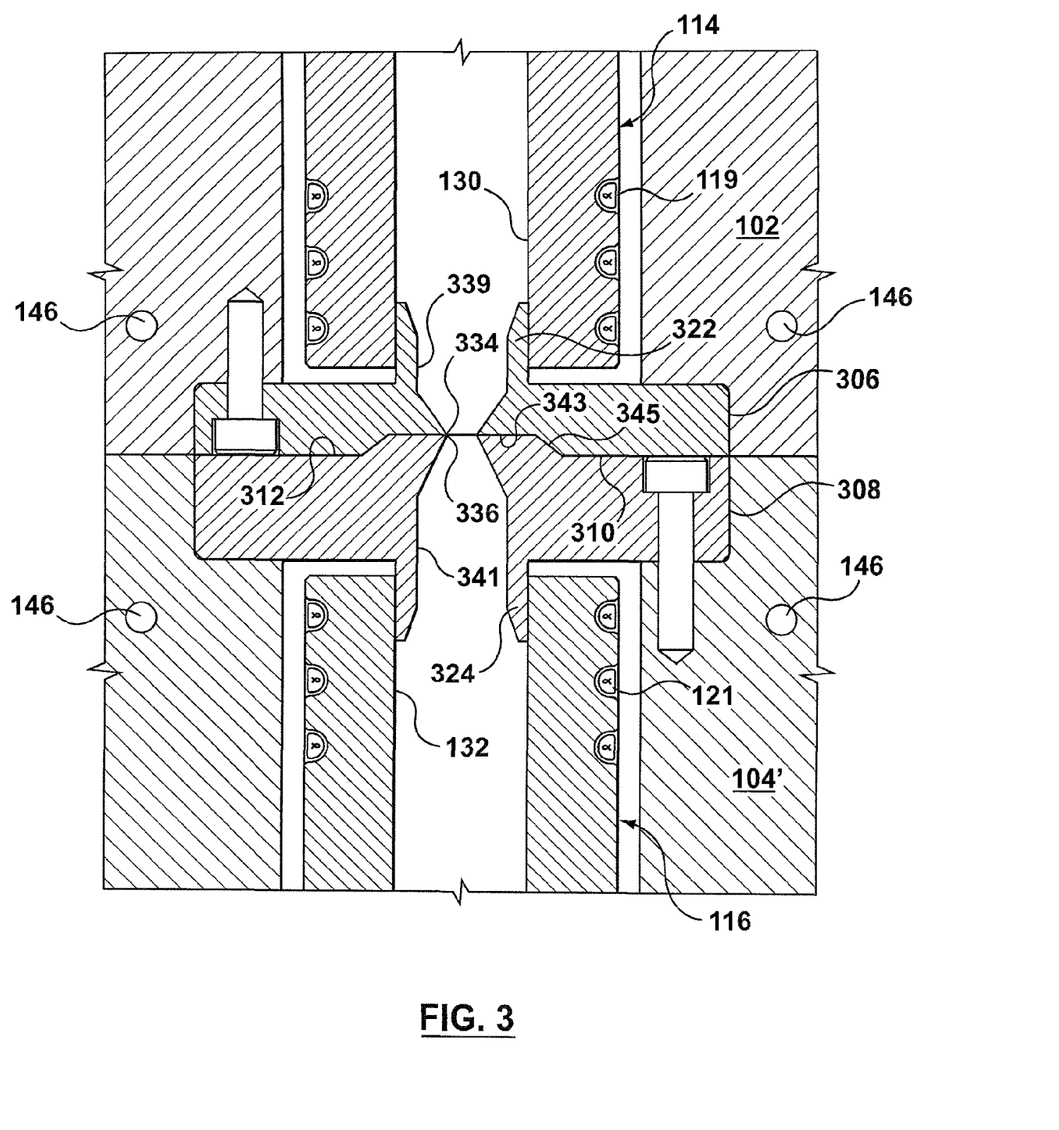
FIG. 3 is a schematic sectional view of melt transfer components according to another embodiment of the present invention.

FIG. 3 is a schematic sectional view of first and second melt transfer components 306, 308 in accordance with another embodiment of the present invention, which includes various features previously described with reference to the embodiment of FIGS. 1 and 2. As in the previous embodiment, melt transfer components 306, 308 include melt channels 339, 341, respectively, and first and second spigot portions 322, 324, respectively. First and second spigot portions 322, 324 are slidably received within melt transfer nozzle melt channels 130, 132, respectively, such that melt channels 339, 341 of first and second melt transfer components 306, 308 are in fluid communication therewith. In addition, first and second melt transfer components 306, 308 include means for aligning apertures 334, 336 on respective first and second sealing surfaces 310, 312 thereof. In the embodiment shown, the means for aligning apertures 334, 336 consists of a recess 343 within first sealing surface 310 and a corresponding protrusion 345 extending from second sealing surface 312. Each of recess 343 and protrusion 345 have corresponding tapered surfaces for ease of alignment of first and second melt transfer components 306, 308 when the stack mold is closed. In another embodiment, alignment pins or dowels may project from one of first and second sealing surfaces 310, 312 to be received by corresponding bores or recesses in the opposing sealing surface for ease of alignment of first and second melt transfer components 306, 308 when the stack mold is closed. As in the previous embodiment, first and second melt transfer components 306, 308 are secured to stationary platen 102 and mold plate 104' of moveable center platen 104, respectively, by one or more bolts, such that neither of the first and second melt transfer components 306, 308 move relative to their respective mold platen/plate or melt transfer nozzle.

Figure 4:
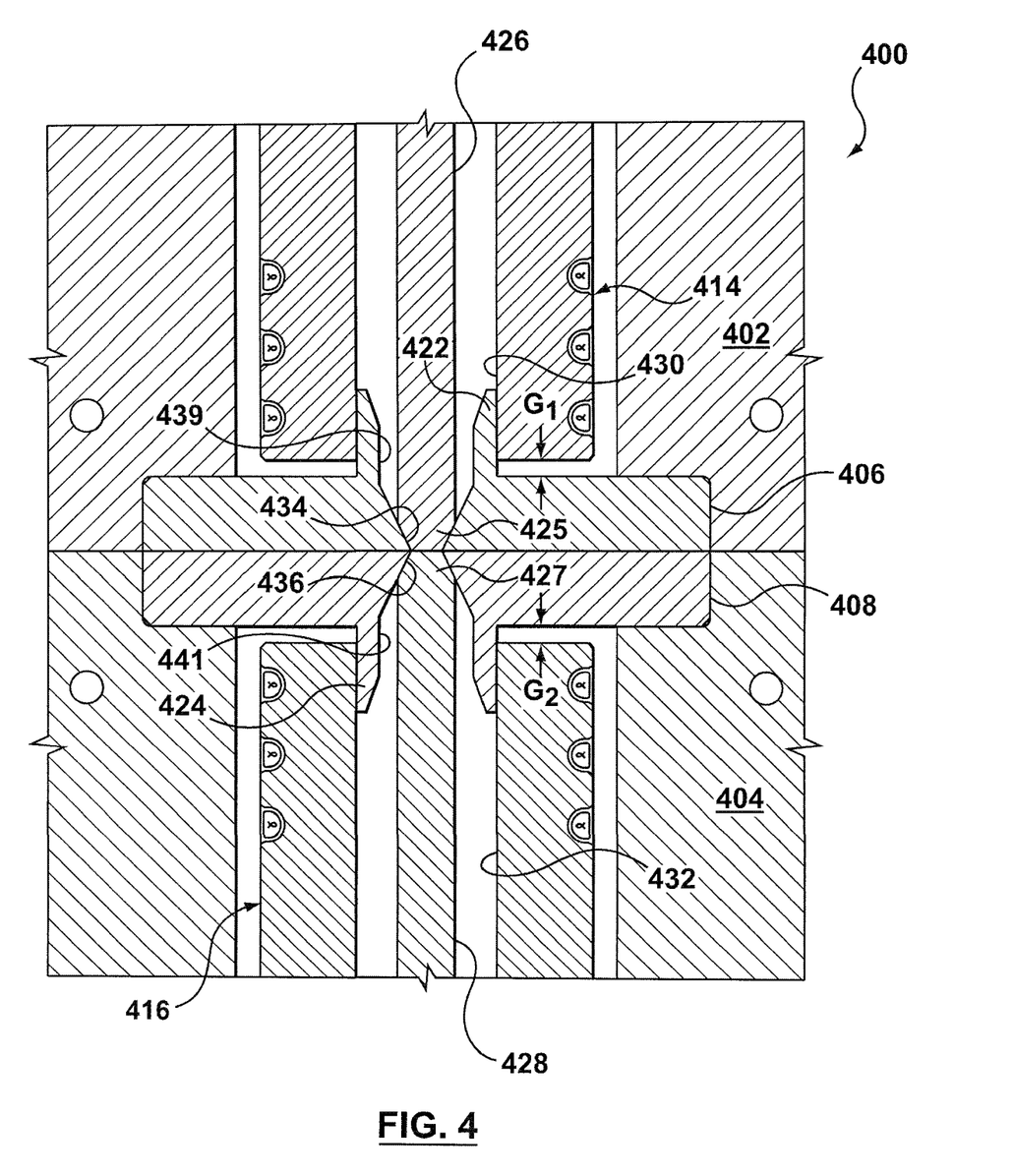
FIG. 4 is a schematic sectional view of valve-gated melt transfer components according to another embodiment of the present invention.

FIG. 4 is a schematic sectional view of valve-gated first and second melt transfer components 406, 408 of stack molding system 400 in accordance with another embodiment of the present invention. First melt transfer nozzle 414 is a valve-gated nozzle positioned within stationary mold platen 402 that includes a valve pin 426, which is slidable within melt channel 430. Valve pin 426 is moved by an actuator (not shown) between an open position, wherein a head portion 425 of valve pin 426 is positioned upstream of aperture 434 of melt transfer component 406, and the closed position shown in FIG. 4, wherein head portion 425 is seated within aperture 434. Similarly, second melt transfer nozzle 416 is a valve-gated nozzle positioned within movable mold platen 404 that includes a valve pin 428, which is slidable within melt channel 432. Valve pin 428 is moved by an actuator (not shown) between an open position, wherein a head portion 427 of valve pin 428 is positioned downstream of aperture 436 of melt transfer component 408, and the closed position shown in FIG. 4, wherein head portion 427 is seated within aperture 436.

As in the previous embodiments, first and second spigot portions 422, 424 of first and second melt transfer components 406, 408, respectively, are slidably received within melt transfer nozzle melt channels 430, 432, respectively, such that melt channels 439, 441 of first and second melt transfer components 406, 408 are in fluid communication therewith. When stack molding system 400 is brought to an operating temperature, gaps $G_1$, $G_2$ between melt transfer nozzles 414, 416 and respective melt transfer components 406, 408 in conjunction with the sliding arrangement between first and second spigots 422, 424 and melt channels 430, 432, respectively, accommodate the heat expansion of valve-gated melt transfer nozzles 414, 416, respectively.

First and second melt transfer components 406, 408 may be secured to stationary mold platen 402 and moveable mold platen 404, respectively, by one or more bolts as in the previous embodiments or by another means known to one of skill in the art that would fixedly attach first and second melt transfer components 406, 408 to their respective platens such that there is no relative movement there between.

Figure 5:
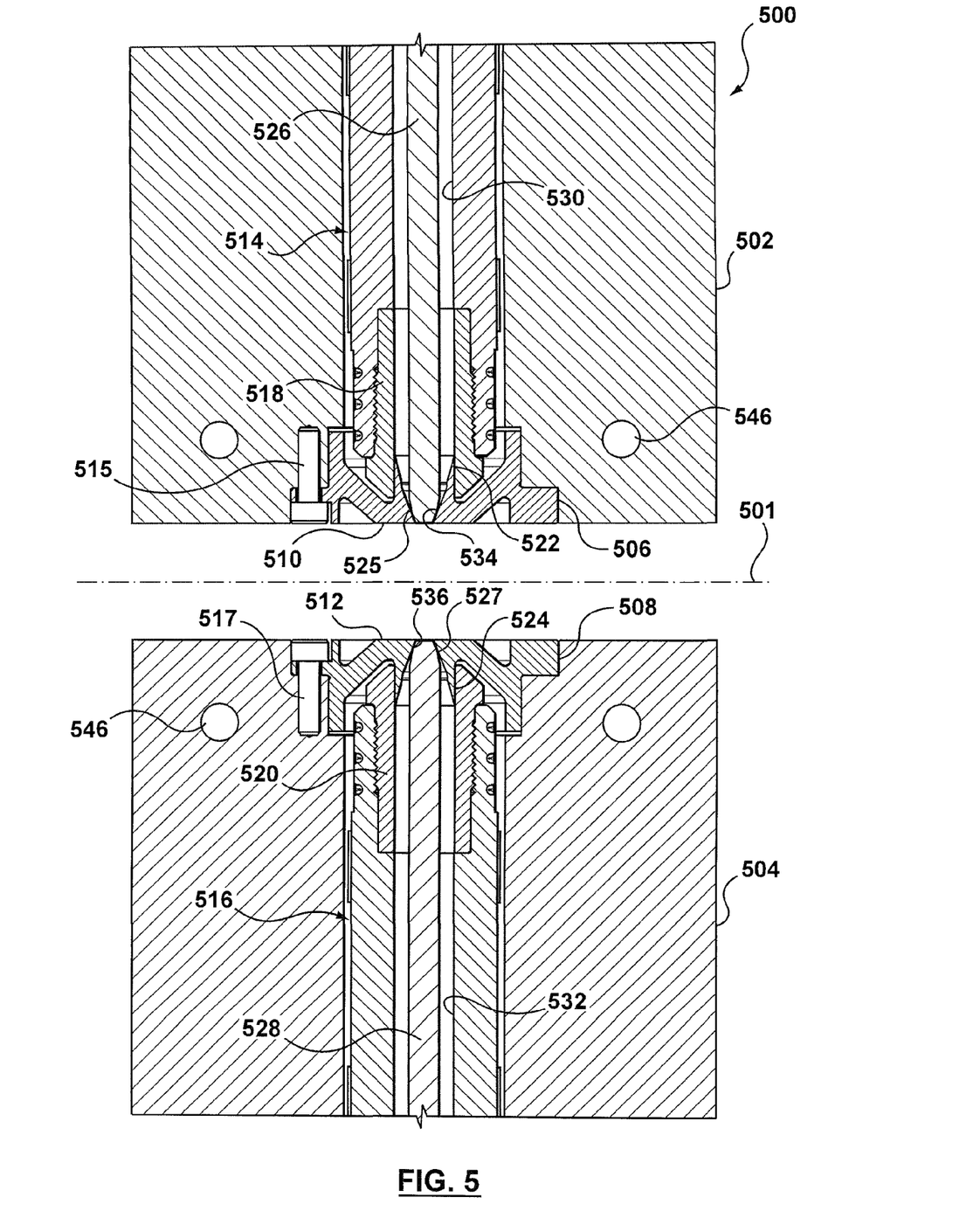
FIG. 5 is a schematic sectional view of valve-gated melt transfer components according to another embodiment of the present invention in a mold open configuration.
Figure 6:
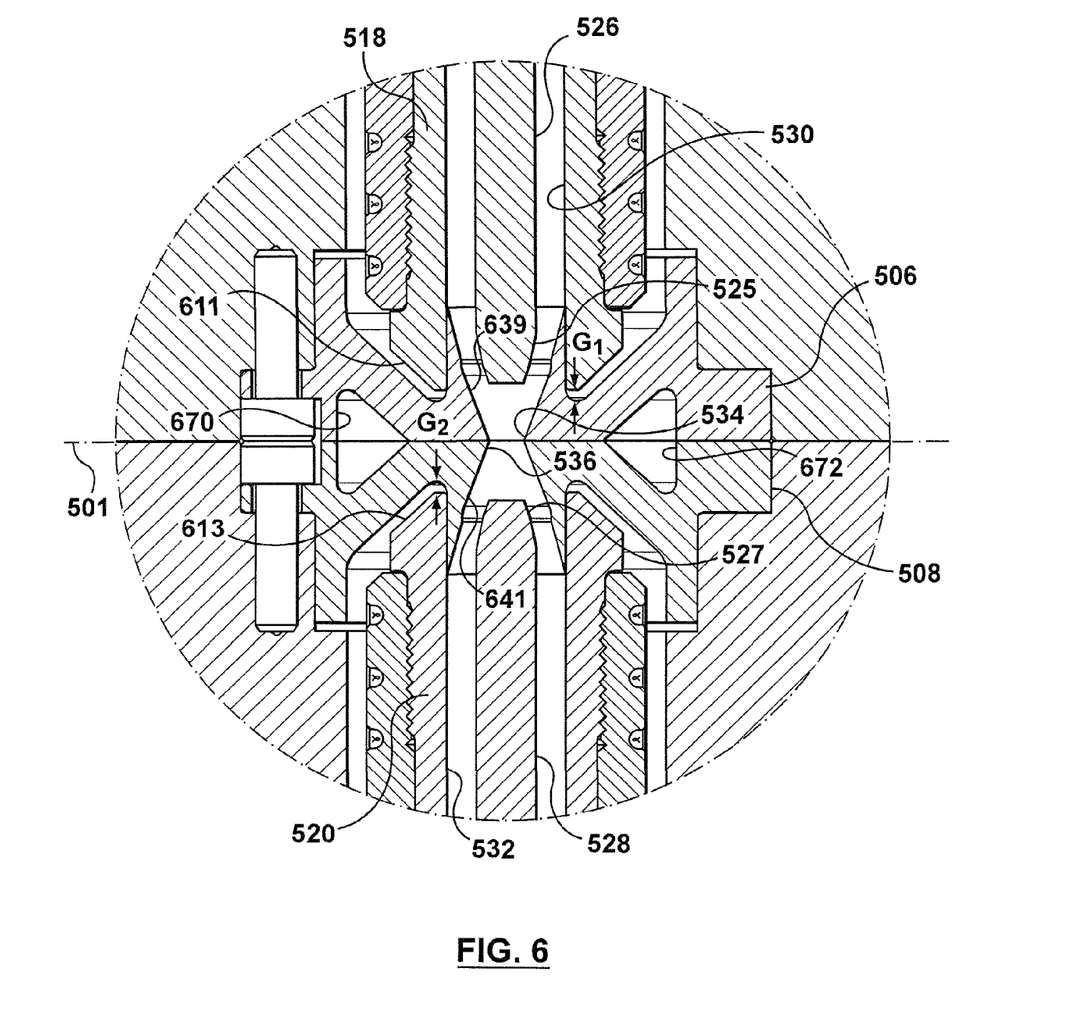
FIG. 6 is an enlarged view of the valve-gated melt transfer components shown in FIG. 5 in a mold closed configuration.

FIG. 5 is a schematic sectional view of valve-gated first and second melt transfer components 506, 508 of stack molding system 500 in a mold open configuration in accordance with another embodiment of the present invention, with FIG. 6 being an enlarged view of the melt transfer area of FIG. 5 in a mold closed configuration. First melt transfer nozzle 514 includes a valve pin 526 and a transfer seal 518 and is positioned within stationary mold platen 502, which includes cooling channels 546. Valve pin 526 is slidable within melt channel 530 of first melt transfer nozzle 514, which has a downstream portion defined by an inner surface of transfer seal 518. Valve pin 526 is moved by an actuator (not shown) between the open position shown in FIG. 6, wherein a head portion 525 of valve pin 526 is positioned upstream of aperture 534 of melt transfer component 506, and the closed position shown in FIG. 5, wherein head portion 525 is seated within aperture 534. Similarly, second melt transfer nozzle 516 includes a valve pin 528 and a transfer seal 520 and is positioned within movable mold platen 504, which includes cooling channels 546. Valve pin 528 is slidable within melt channel 532 of second melt transfer nozzle 516, which has an upstream portion defined by an inner surface of transfer seal 520. Valve pin 528 is moved by an actuator (not shown) between the open position shown in FIG. 6, wherein a head portion 527 of valve pin 528 is positioned downstream of aperture 536 of melt transfer component 508, and the closed position shown in FIG. 5, wherein head portion 527 is seated within aperture 536.

First and second spigot portions 522, 524 of first and second melt transfer components 506, 508, respectively, are slidably received within respective portions of melt channels 530, 532 that are defined by transfer seals 518, 520. Accordingly, melt channels 639, 641 of first and second melt transfer components 506, 508 are in fluid communication with melt channels 530, 532, respectively. First and second melt transfer components 506, 508 also have opposed first and second sealing surfaces 510, 512, respectively, that abut each other along parting line 501 in the mold closed position, as shown in FIG. 6. In the embodiment shown in FIGS. 5 and 6, each of melt transfer components 506, 508 includes an annular recess 670, 672 radially spaced from apertures 534, 536, respectively, such that contact and thereby heat transfer are reduced between first and second sealing surfaces 510, 512 of first and second melt transfer components 506, 508, respectively.

In a cold condition, a gap $G_1$ separates a downstream end 611 of transfer seal 518 and an opposing surface of first melt transfer component 506 and a gap $G_2$ separates an upstream end 613 of transfer seal 520 and an opposing surface of second melt transfer component 508. When stack molding system 500 is brought to an operating temperature, gaps $G_1$, $G_2$ in conjunction with the sliding arrangement between first and second spigots 522, 524 and melt channels 530, 532, respectively, accommodate the heat expansion of valve-gated melt transfer nozzles 514, 516, respectively.

First and second melt transfer components 506, 508 are secured to stationary mold platen 502 and moveable mold platen 504, respectively, by one or more bolts 515, 517, respectively, as in the previous embodiments. However, first and second melt transfer components 506, 508 may be fixedly attach to their respective platens such that there is no relative movement there between by any suitable means known to one of skill in the art.

Figure 7:
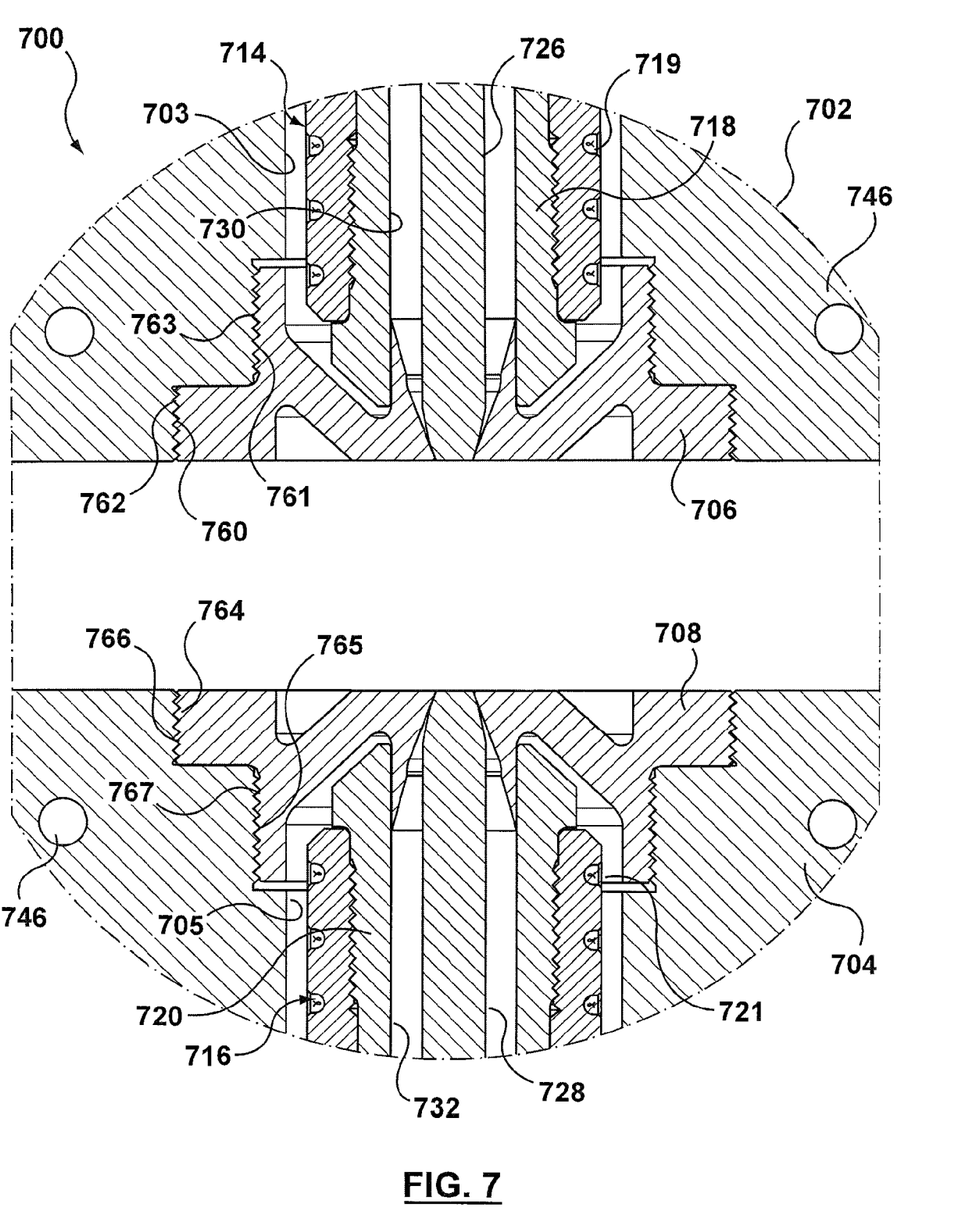
FIG. 7 is a schematic sectional view of valve-gated melt transfer components according to another embodiment of the present invention.

FIG. 7 is a schematic sectional view of valve-gated first and second melt transfer components 706, 708 of a stack molding system 700 in accordance with another embodiment of the present invention. First melt transfer nozzle 714 includes a valve pin 726, a transfer seal 718, and an embedded heating element 719. First melt transfer nozzle 714 is seated within well 703 of stationary mold platen 702, which includes cooling channels 746. Valve pin 726 is slidable within melt channel 730, which has a downstream portion defined by an inner surface of transfer seal 718. Valve pin 726 is moved by an actuator (not shown) and operates to allow or restrict melt flow in conjunction with first melt transfer component 706 in a manner as described with reference to the embodiment of FIGS. 5 and 6. Similarly, second melt transfer nozzle 716 includes a valve pin 728, a transfer seal 720 and an embedded heating element 721. Second melt transfer nozzle 716 is seated within well 705 of movable mold platen 704, which includes cooling channels 746. Valve pin 728 is slidable within melt channel 732, which has an upstream portion defined by an inner surface of transfer seal 720. Valve pin 728 is moved by an actuator (not shown) and operates to allow or restrict melt flow in conjunction with second melt transfer component 708 in a manner as described with reference to the embodiment of FIGS. 5 and 6

First and second melt transfer components 706, 708 are structurally and operatively identical to first and second melt transfer components 506, 508 of the previous embodiment except for in the manner in which each is attached to its respective platen. In the embodiment of FIG. 7, first melt transfer component 706 includes first and second threaded portions 762, 763 that are threadably engaged with corresponding first and second threaded portions 760, 761 of stationary mold platen 702. Similarly, second melt transfer component 708 includes first and second threaded portions 766, 767 that are threadably engaged with corresponding first and second threaded portions 764, 765 of moveable mold platen 704. Although each of first and second melt transfer components 706, 708 includes two threaded portions, it would be understood by one of skill in the art that a single threaded portion could be used without departing from the scope hereof.

Figure 8:
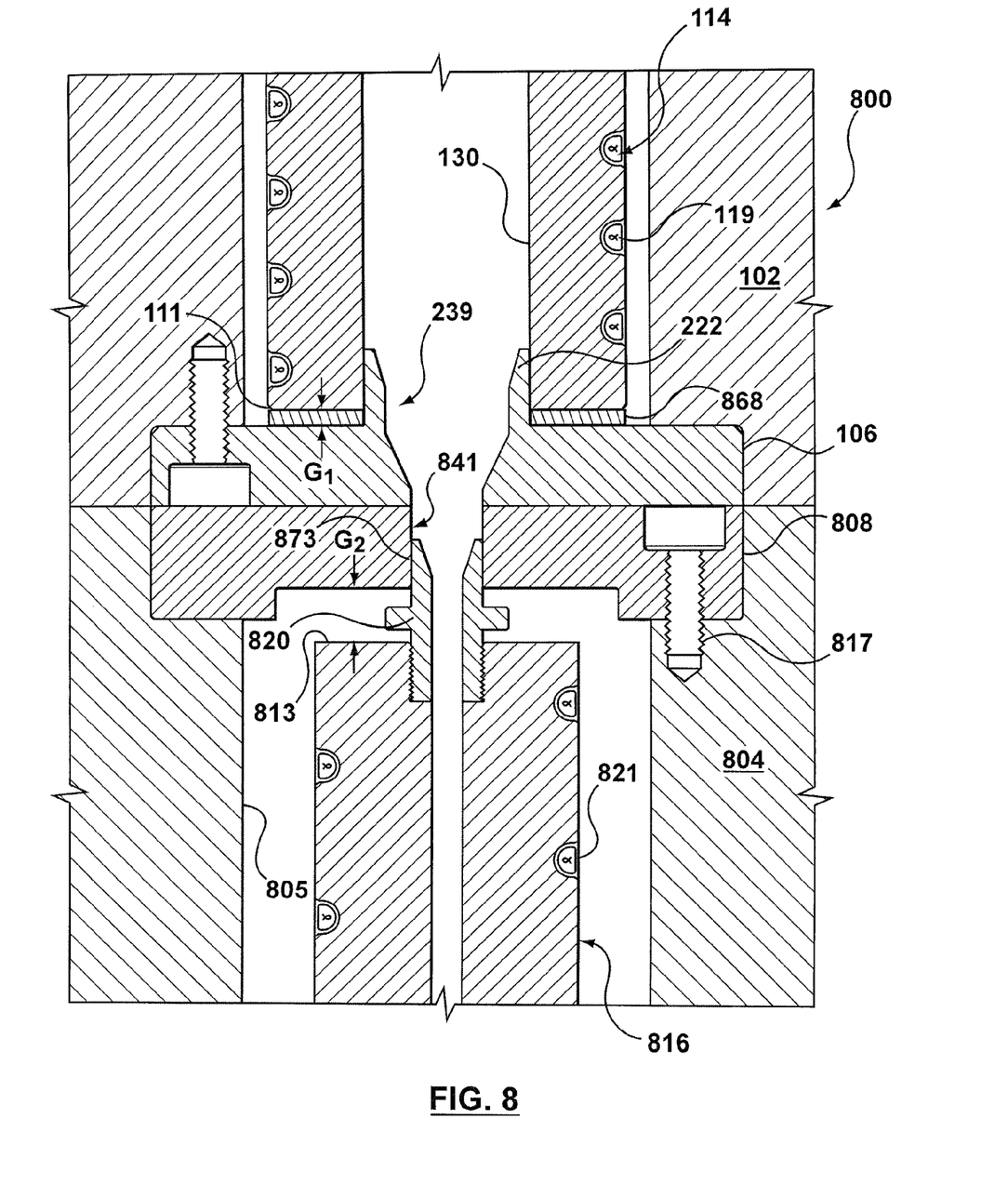
FIG. 8 is a schematic sectional view of melt transfer components according to another embodiment of the present invention.

FIG. 8 is a schematic sectional view of stack molding system 800 in accordance with another embodiment of the present invention. Stack molding system 800 includes an upstream portion within stationary mold platen 102 that was previously described with reference to the embodiment of FIGS. 1 and 2, and as such these features and there operation will not be further described herein except as to additional features. Stack molding system 800 includes a downstream portion having a second melt transfer nozzle 816 with an embedded heating element 821 seated within well 805 of moveable center platen 804 and a melt transfer component 808 fixedly attached to moveable mold platen 804 by one or more bolts 817. Second melt transfer nozzle 816 includes a transfer seal 820 threadably secured within upstream end 113. Transfer seal 820 has an upstream portion 873 that is slidably receivable within melt channel 841 of second melt transfer component 808.

In stack molding system 800, an annular seal 868 is disposed about spigot portion 222 of first melt transfer component 106 within the gap $G_1$ that separates downstream end 111 of first melt transfer nozzle 114 and an opposed, upstream surface of first melt transfer component 106. Annular seal 868 is of a compressible material such that it may accommodate thermal expansion of first melt transfer nozzle 114 as stack molding system 800 is brought to an operating temperature. Annular seal 868 also seals between first melt transfer nozzle 114 and first melt transfer component 106 to prevent melt leakage during a production cycle. In a cold condition, gap $G_2$ separates an upstream end 813 of second melt transfer nozzle 816 and an opposed, downstream surface of second melt transfer component 808. When stack molding system 800 is brought to an operating temperature, gap $G_1$ in conjunction with the sliding arrangement between first spigot portion 222 and melt channel 130 of first melt transfer nozzle 114 and gap $G_2$ in conjunction with the sliding arrangement between transfer seal 820 and melt channel 841 of second melt transfer component 808 accommodate the heat expansion of first and second melt transfer nozzles 114, 816.

Figure 9:
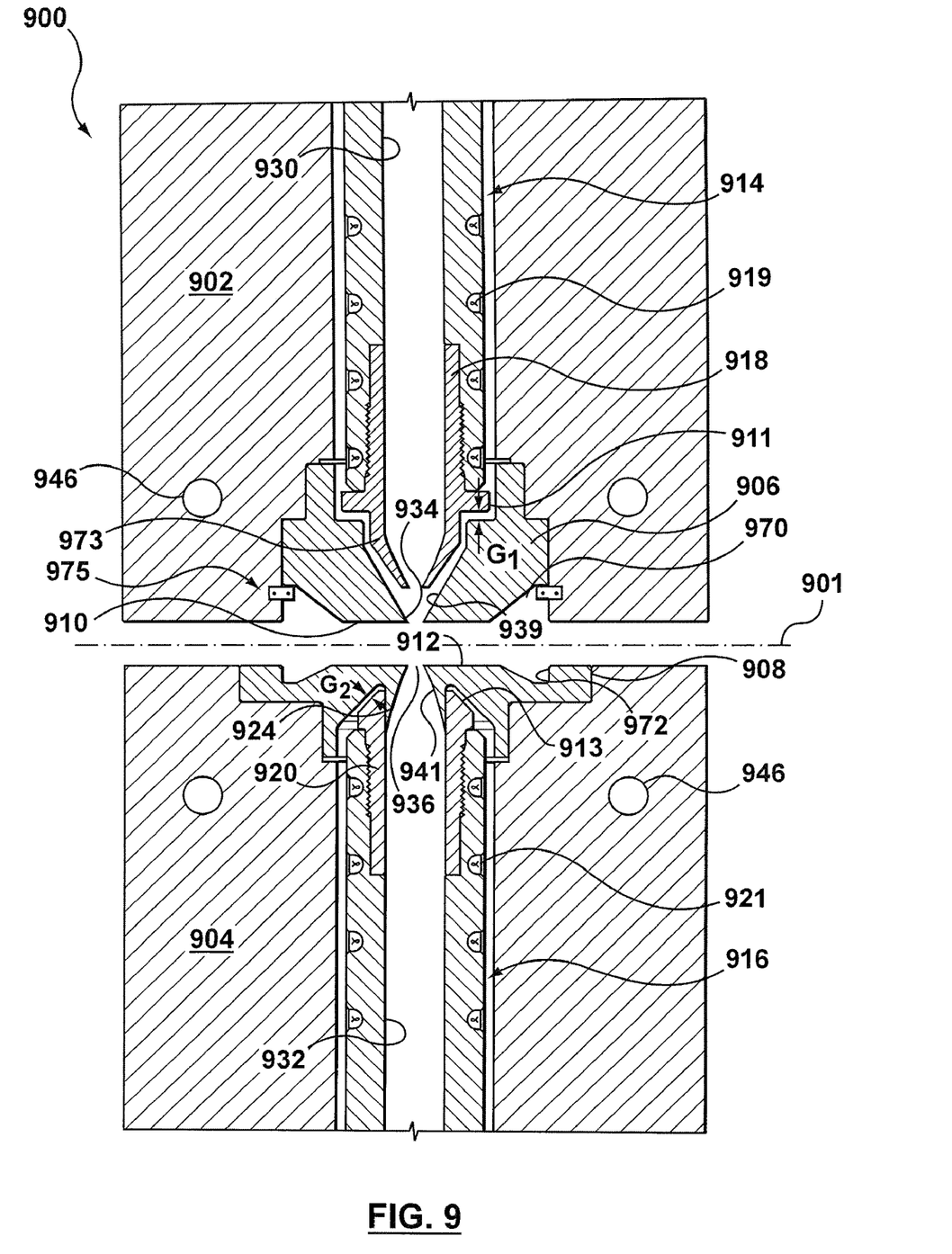
FIG. 9 is a schematic sectional view of melt transfer components according to another embodiment of the present invention.

FIG. 9 is a schematic sectional view of first and second melt transfer components 906, 908 of stack molding system 900 in a mold open configuration in accordance with another embodiment of the present invention. First melt transfer nozzle 914 is positioned within stationary mold platen 902, which includes cooling channels 946. First melt transfer nozzle 914 includes a heating element 919 and a transfer seal 918 threadably attached within a downstream end thereof. Melt channel 930 of first melt transfer nozzle 914 has a downstream portion defined by an inner surface of transfer seal 918. Transfer seal 918 has a downstream portion 973 that is slidably receivable within melt channel 939 of first melt transfer component 906. Accordingly, melt channel 939 of first melt transfer component 906 is in fluid communication with melt channel 930 of first melt transfer nozzle 914.

Second melt transfer nozzle 916 is positioned within movable mold platen 904, which includes cooling channels 946. Second melt transfer nozzle 916 includes a heating element 921 and a transfer seal 920 threadably secured within a downstream end thereof. Spigot portion 924 of second melt transfer component 908 is slidably received within an upstream portion of melt channel 932 of second melt transfer nozzle 916 that is defined by transfer seal 920. Accordingly, melt channel 941 of second melt transfer component 908 is in fluid communication with melt channel 932 of second melt transfer nozzle 916.

First and second melt transfer components 906, 908 have opposed first and second sealing surfaces 910, 912, respectively, that abut each other along parting line 901 in the mold closed position. Similar to the embodiments of FIGS. 5-7, each of first and second melt transfer components 906, 908 includes an annular recess 970, 972 radially spaced from apertures 934, 936, respectively, such that contact and thereby heat transfer are reduced between first and second melt transfer components 906, 908, respectively.

In a cold condition, a gap $G_1$ separates a downstream end 911 of transfer seal 918 and an opposing surface of first melt transfer component 906 and a gap $G_2$ separates an upstream end 913 of transfer seal 920 and an opposing surface of second melt transfer component 908. When stack molding system 900 is brought to an operating temperature, gap $G_1$ in conjunction with the sliding arrangement between transfer seal 918 and melt channel 939 of first melt transfer component 906 and gap G₂ in conjunction with the sliding arrangement between second spigot portion 924 of second melt transfer component 908 and melt channel 932 of second melt transfer nozzle 916 accommodate the heat expansion of first and second melt transfer nozzles 914, 916.

First melt transfer component 906 is secured to stationary platen 902 by a c-clip 975, whereas second melt transfer component 908 may be fixedly attach to moveable mold platen 904 by one or more bolts (not shown) or any other suitable attachment means known to one of skill in the art.

In the embodiments described above, the melt transfer components may be made from tool steel (H13) or stainless steel, however they can be made from any material suitable for injection molding mold components.

It should be understood by one of skill in the art that embodiments of the present invention may be utilized at any plate or platen interface of a multi-level stack molding system where the melt stream is being transferred to include the transfer of the melt stream between adjacent movable mold platens. Examples of multi-level stack mold apparatus that may be adapted to be used with embodiments described herein are shown and described in U.S. Pat. No. 7,122,145 to Olaru et al, which is incorporated by reference herein in its entirety.

While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A stack molding apparatus comprising:
   a first mold platen and a second mold platen defining a parting line there between;
   a first melt transfer component having a first sealing surface and a first spigot portion, the first melt transfer component being fixedly attached to the first mold platen such that the first sealing surface defines a portion of the parting line;
   a second melt transfer component having a second sealing surface and a second spigot portion, the second melt transfer component being fixedly attached to the second mold platen such that the second sealing surface defines a portion of the parting line;
   a first melt transfer nozzle extending within the first mold platen, the first melt transfer nozzle defining a first melt channel there through for transporting a melt stream from a melt source, wherein the first spigot portion of the first melt transfer component is slidably fit within a downstream end of the first melt channel; and
   a second melt transfer nozzle extending within the second mold platen, the second melt transfer nozzle defining a second melt channel there through for receiving the melt stream from the first melt transfer nozzle, wherein the second spigot portion of the second melt transfer component is slidably fit within an upstream end of the second melt channel,
   wherein as the stack molding apparatus is brought to an operating temperature the first and second melt transfer nozzles slide over the first and second spigot portions, respectively, to accommodate thermal expansion.

2. The stack molding apparatus of claim 1, further comprising:
   a first valve pin slidably positioned within the first melt channel of the first melt transfer nozzle, the first valve pin having a head portion for closing an aperture of the first melt transfer component to prevent the melt stream from flowing there through; and
   a second valve pin slidably positioned within the second melt channel of the second melt transfer nozzle, the second valve pin having a head portion for closing an aperture of the second melt transfer component to prevent the melt stream from flowing there through.

3. The stack molding apparatus of claim 1, further comprising:
   a first transfer seal attached to the first melt transfer nozzle and defining the downstream end of the first melt channel; and
   a second transfer seal attached to the second melt transfer nozzle and defining the upstream end of the second melt channel,
   wherein the first and second spigot portions of the first and second melt transfer components are slidably fit within the first and second transfer seals, respectively.

4. The stack molding apparatus of claim 1, further comprising:
   a first valve pin slidably positioned within the first melt channel of the first melt transfer nozzle, the first valve pin having a head portion for closing an aperture of the first melt transfer component to prevent the melt stream from flowing there through; and
   a second valve pin slidably positioned within the second melt channel of the second melt transfer nozzle, the second valve pin having a head portion for closing an aperture of the second melt transfer component to prevent the melt stream from flowing there through.

5. The stack molding apparatus of claim 1, wherein the first and second sealing surfaces of the first and second melt transfer components are in sealing contact when the stack molding apparatus is in a mold closed configuration.

6. The stack molding apparatus of claim 5, wherein the first and second sealing surfaces have corresponding means for aligning the first and second melt transfer components in the mold closed configuration.

7. The stack molding apparatus of claim 6, wherein the means for aligning includes a recess within the first sealing surface and a corresponding protrusion extending from the second sealing surface.

8. The stack molding apparatus of claim 1, wherein the first spigot portion of the first melt transfer component is a tubular projection that extends from a base portion of the first melt transfer component.

9. The stack molding apparatus of claim 8, wherein the tubular projection has an outer diameter that is substantially equal to an inner diameter of the first melt channel.

10. The stack molding apparatus of claim 1, wherein the first melt transfer component defines a melt channel that tapers from an upstream end of the first spigot portion to an aperture defined in the first sealing surface.

11. The stack molding apparatus of claim 10, wherein the second melt transfer component defines a melt channel that tapers from a downstream end of the second spigot portion to an aperture defined in the second sealing surface.

12. The stack molding apparatus of claim 1, wherein contact between the first melt transfer component and the first melt transfer nozzle is limited to sliding contact between the first spigot portion of the first melt transfer component and the first melt channel of the first melt transfer nozzle.

13. The stack molding apparatus of claim 1, further comprising:
a first heater attached to the first melt transfer nozzle; and
a second heater attached to the second melt transfer nozzle.

14. The stack molding apparatus of claim 1, wherein the first mold platen is a stationary mold platen and the second mold platen is a movable mold platen.

15. The stack molding apparatus of claim 14, further comprising:
a manifold positioned within the movable mold platen for receiving the melt stream from the second melt transfer nozzle.

16. The stack molding apparatus of claim 1, wherein the first mold platen is a first movable mold platen and the second mold platen is a second movable mold platen.

17. The stack molding apparatus of claim 1, wherein the melt source is an injection molding machine.

18. A stack molding apparatus comprising:
a stationary mold platen and a movable mold platen defining a parting line there between;
a primary melt transfer component having a spigot portion, the primary melt transfer component being fixedly attached to the stationary mold platen; and
a primary melt transfer nozzle extending within a well in the stationary mold platen, the primary melt transfer nozzle defining a melt channel there through for receiving a melt stream from a melt source,
wherein the spigot portion of the primary melt transfer component is slidably fit within a downstream end of the melt channel of the primary melt transfer nozzle so that as the stack molding apparatus is brought to an operating temperature the primary melt transfer nozzle slides over the spigot portion of the primary melt transfer component to accommodate thermal expansion.

19. The stack molding apparatus of claim 18 further comprising:
a secondary melt transfer nozzle extending within a well in the movable mold platen, the secondary melt transfer nozzle having a transfer seal and defining a melt channel there through for receiving the melt stream from the primary melt transfer nozzle, wherein an upstream portion of the melt channel is defined by an inner surface of the transfer seal; and
a secondary melt transfer component having a melt channel, the secondary melt transfer component being fixedly attached to the movable mold platen,
wherein an upstream portion of the transfer seal of the secondary melt transfer nozzle is slidably fit within the melt channel of the secondary melt transfer component so that as the stack molding apparatus is brought to an operating temperature the upstream portion of the transfer seal slides within the melt channel of the secondary melt transfer component to accommodate thermal expansion.

20. The stack molding apparatus of claim 18 further comprising:
an annular seal surrounding the spigot portion of the primary melt transfer component, wherein the annular seal is positioned between a downstream end of the primary melt transfer nozzle and an upstream surface of the primary melt transfer component.

21. A stack molding apparatus comprising:
a stationary mold platen and a movable mold platen defining a parting line there between;
a primary melt transfer nozzle extending within a well in the stationary mold platen, the primary melt transfer nozzle having a transfer seal and defining a melt channel there through for receiving a melt stream from a melt source, wherein a downstream portion of the melt channel is defined by an inner surface of the transfer seal; and
a primary melt transfer component having a melt channel and an aperture in a sealing surface thereof, the primary melt transfer component being fixedly attached to the stationary mold platen such that the sealing surface defines a portion of the parting line,
wherein a downstream end of the transfer seal of the primary melt transfer nozzle is slidably fit within the melt channel of the primary melt transfer component such that when the stack molding apparatus is brought to an operating temperature the downstream end of the transfer seal slides within the melt channel of the primary melt transfer component to accommodate thermal expansion.

22. The stack molding apparatus of claim 21 further comprising:
a secondary melt transfer nozzle extending within a well in the movable mold platen, the secondary melt transfer nozzle having a transfer seal and defining a melt channel there through for receiving the melt stream from the primary melt transfer nozzle, wherein an upstream portion of the melt channel is defined by an inner surface of the transfer seal; and
a secondary melt transfer component having a sealing surface and a spigot portion, the secondary melt transfer component being fixedly attached to the movable mold platen such that the sealing surface defines a portion of the parting line,
wherein the spigot portion of the secondary melt transfer component is slidably fit within the melt channel of the transfer seal of the secondary melt transfer nozzle so that as the stack molding apparatus is brought to an operating temperature the secondary melt transfer nozzle slides over the spigot portion of the secondary melt transfer component to accommodate thermal expansion.

* * * * *